United States Patent Office 2,733,259
Patented Jan. 31, 1956

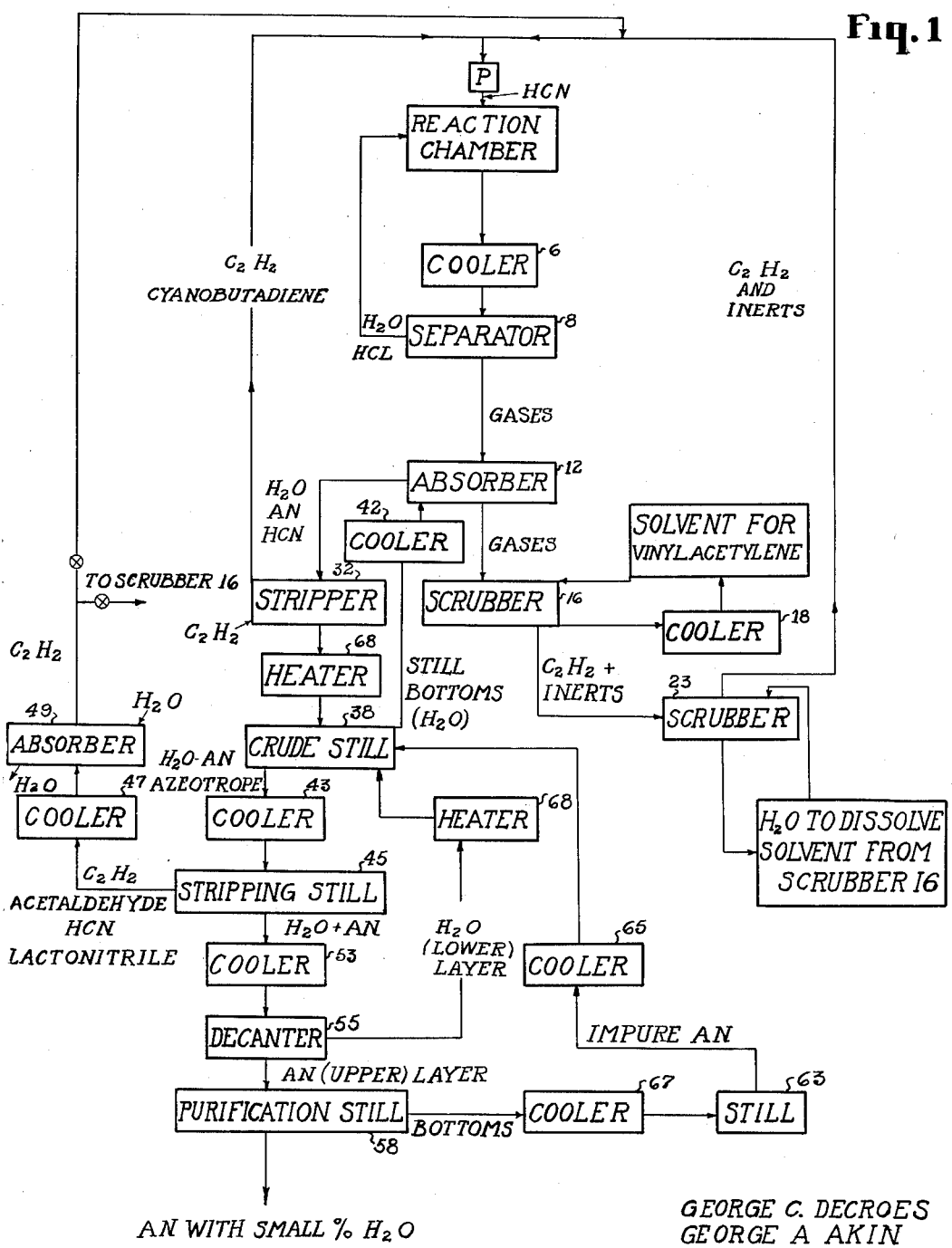

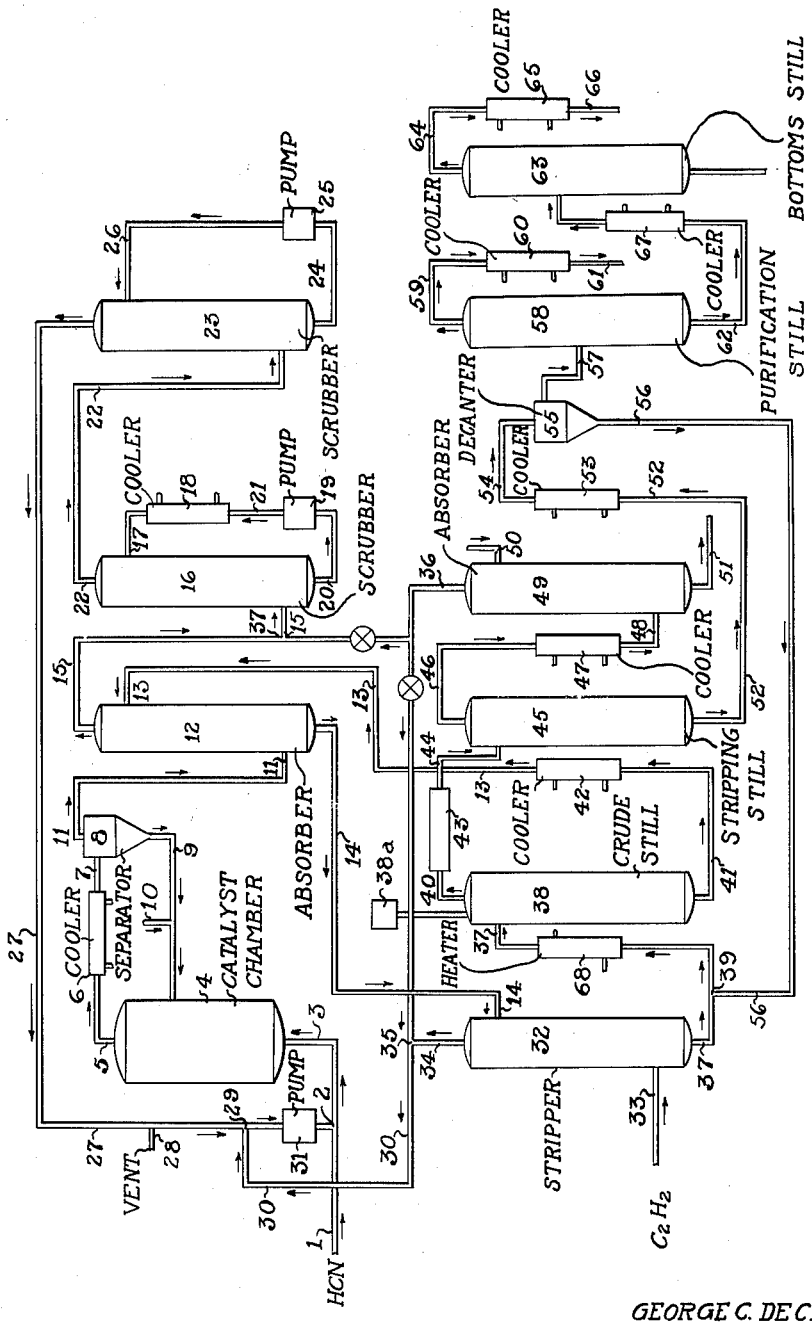

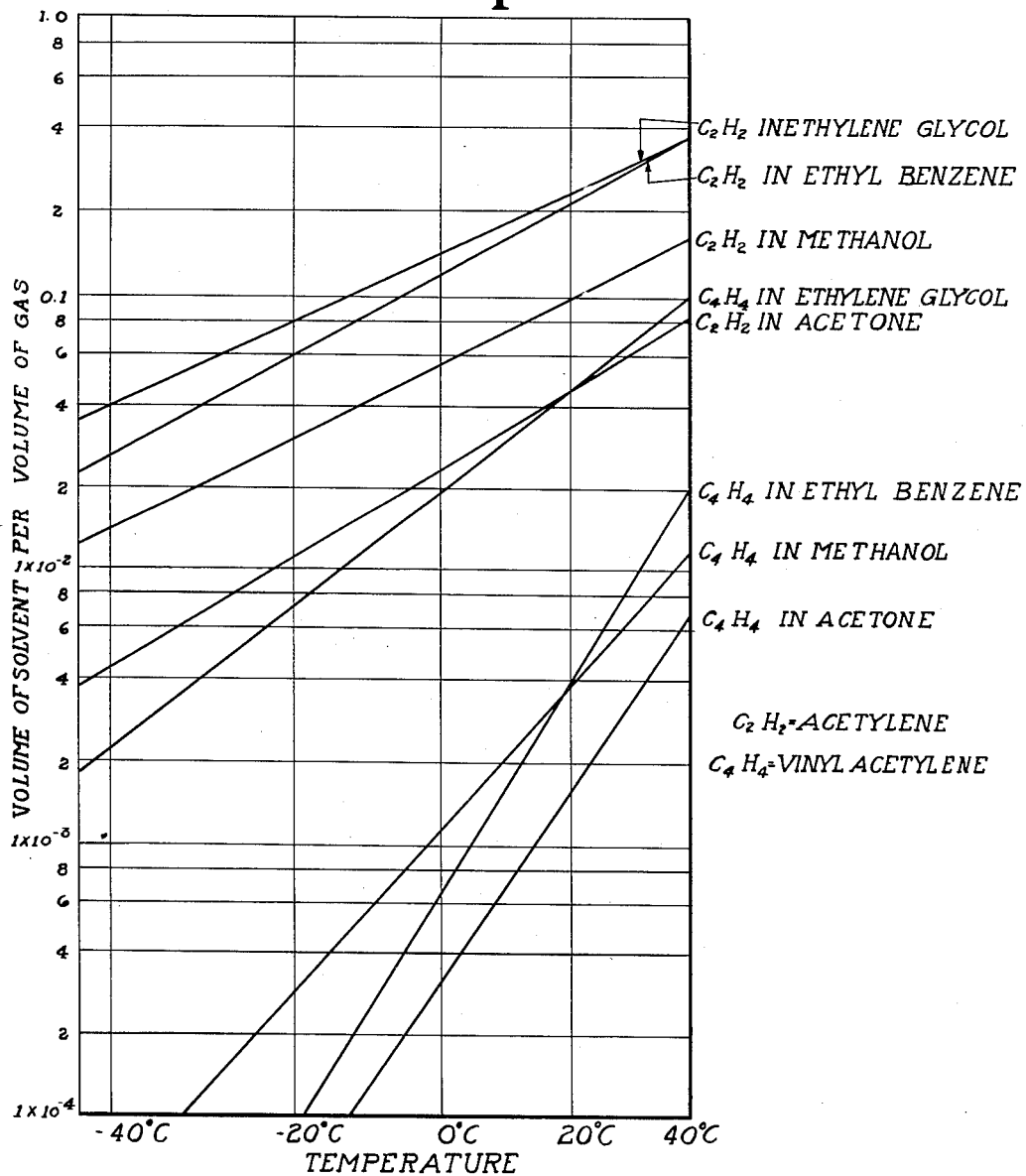

2,733,259

MANUFACTURE OF ACRYLONITRILE FROM ACETYLENE AND HYDROCYANIC ACID

George C. De Croes and George A. Akin, Kingsport, Tenn., assignors to Eastman Kodak Company, Rochester, N. Y., a corporation of New Jersey Application August 22, 1951, Serial No. 243,128

4 Claims. (Cl. 260—465.3)

This invention relates to improvements in the manufacture of acrylonitrile and more particularly to the manufacture of acrylonitrile in a liquid phase process by the reaction of acetylene and hydrocyanic acid.

It has already been proposed to prepare acrylonitrile by reacting acetylene with hydrocyanic acid in the presence of a catalyst containing a cuprous compound. Thus, acetylene and hydrocyanic acid can be passed into an aqueous solution containing cuprous chloride, bromide, or iodide, and ammonium bromide or chloride or the corresponding sodium or potassium salts. This type of catalyst solution is referred to as a Nieuwland catalyst. The reaction can be carried out at ordinary or elevated temperatures, and the acrylonitrile can be recovered by solvent extraction with water or by azeotropic distillation. Patents referring to this type of process are Kurtz et al. U. S. 2,324,854, Bradley et al., U. S. 2,385,327, Salley U. S. 2,385,469, Salley et al. U. S. 2,385,470, Heuser U. S. 2,409,124, Farlow et al. U. S. 2,417,068, Howk U. S. 2,423,318, Foster U. S. 2,442,040, Davis et al., U. S. 2,454,308, and Kurtz U. S. 2,486,659. A number of reports have also been published relating to work carried out in Germany on this type of process. These include:

BIOS Report, Item No. 22, File No. XXIII–25, "Miscellaneous Chemicals, I. G. Farbenindustrie, A. G. Elberfeld and Leverkusen" (April 27, 1945) by F. J. Curtis and M. F. Fogler.

BIOS Miscellaneous Report No. 90, "Process for the Manufacture of Acrylonitrile from Acetylene and Hydrocyanic Acid—Leverkusen—Supplementary Information" by A. S. Fromholz.

BIOS Final Report No. 92, Item No. 22, "Production of Acrylonitrile at Leverkusen Plant of I. G. Farbenindustrie," by A. Cambron.

BIOS Final Report No. 759, Item No. 22, "Pilot Plant for Manufacture of Acrylonitrile," by M. A. Mathews.

BIOS Final Report No. 1057, Item Nos. 22 and 30, "German Acetylene Chemical Industry, Acrylonitrile Manufacture and Possible Uses" by D. Brundit and W. Hunter.

FIAT Final Report No. 14, "Preparation of Acrylonitrile at I. G. Gendorf" (September 4, 1945) by L. H. Smith, G. P. Hoff, J. B. Quig, D. B. Wicker and S. S. Schilthuis.

FIAT Final Report No. 836, "Production of Acrylonitrile in I. G. Farbindustrie Plants at Ludwigshafen, Huls and Leverkusen (July 18, 1946) by R. L. Hasche and J. G. McNally.

FIAT Final Report No. 1025 "Production of Acrylonitrile at Leverkusen" (January 10, 1947) by A. S. Carter.

FIAT Final Report No. 1125 "Manufacture of Acrylonitrile by Addition of Hydrocyanic Acid to Acetylene" (May 23, 1947) by F. Nill and R. Largent.

(BIOS and FIAT reports are available from the U. S. Dept. of Commerce, Office of Technical Services.)

In the commercial application of these processes, a cycle of operation is generally established involving the steps of continuously charging the catalyst solution with hydrocyanic acid and acetylene, the materials being introduced in such a manner that the acetylene is in excess, discharging the acrylonitrile, as formed, as a vapor along with some unreacted feed materials, recovering the acrylonitrile, and returning the unreacted gases, mainly acetylene, to the catalyst solution. Fresh acetylene and hydrocyanic acid are added to the cyclic system as needed. The crude acrylonitrile is purified by a series of distillations. In these operations, by-products are formed which reduce the yield of acrylonitrile and which tend to complicate the purification of the acrylonitrile. These include: acetaldehyde, lactonitrile, chloroprene, cyanobutadiene, vinyl acetylene, divinyl acetylene and higher acetylene polymers. In addition to the loss of product due to the formation of these by-products, product is also easily lost by polymerization to form polyacrylonitrile. It is our belief that such polymerization is accelerated by the presence of cyanobutadiene. Further, these by-products decrease the life of the catalyst and some of the by-products are quite hazardous to isolate or handle, in particular divinyl acetylene. Of the by-products formed, divinyl acetylene is particularly undesirable because it has been found quite difficult to separate from acrylonitrile. For example, it forms an azeotrope with acrylonitrile which distills at a temperature very close to that of pure acrylonitrile.

We have found that by reason of our provision of a number of novel process steps and apparatus for carrying them out, we are able to produce and refine acrylonitrile continuously over a long period of time with a minimum cleaning of the apparatus, the provision of high yields of high purity, the prolonging of the catalyst life, the convenient reduction in production of certain undesirable by-products such as cyanobutadiene and the removal of others in a convenient manner, and a reduction in the water and acidity content of the catalyst solution. The various steps to be discussed below each appear novel, and they also cooperate in producing a greatly improved overall result. The novel features of our invention will be discussed in greater detail presently, but they may be summarized briefly as follows:

(a) The removal of cyanobutadiene from an aqueous acrylonitrile solution by stripping with a gas, preferably acetylene, and then passing the acetylene and cyanobutadiene to the reaction chamber where the acetylene takes part in the reaction and the cyanobutadiene inhibits further production of cyanobutadiene. Of considerable importance with regard to this feature is the fact that the cyanobutadiene is removed before any distillation steps are carried out for purifying the acrylonitrile. With the removal of cyanobutadiene at this stage, the formerly troublesome polymerization of acrylonitrile in the stills is substantially avoided, thus permitting operation of the stills over long periods without dismantling for cleaning, as was formerly necessary.

(b) The removal of vinyl acetylene from the gases which do not go into water solution in the first absorber where the gaseous acrylonitrile and other substances are absorbed in water. This removal is accomplished by utilizing our discovery that acetone, methanol or ethyl benzene are highly selective solvents for vinyl acetylene in the presence of acetylene. The removal of vinyl acetylene reduces the formation of undesirable reaction and polymerization products such a divinyl acetylene, higher acetylene polymers, and cyanobutadiene, and the life of the catalyst is also extended by removal of this substance. The gases left after removal of the vinyl acetylene are principally acetylene, which is preferably recycled to the reaction chamber.

(c) The treatment of the gases issuing from the reaction chamber by cooling and separating condensed water and HCl which are returned to the reaction chamber. This assists in maintaining the catalyst in an active state and decreases the necessity for such close control of the operation as would be necessary if these materials were lost.

(d) The stripping of acetylene and gaseous impurities from the water-acrylonitrile azeotrope, the absorbing of the gaseous impurities in water, and the recycling of the purified acetylene to the reaction chamber or to the stripper referred to in (a) above.

(e) The reuse of water used for absorbing the gaseous acrylonitrile after the acrylonitrile is separated. The reuse of this water has not been feasible in previous processes because of foaming and the like.

(f) The removal of gaseous impurities from a water-acrylonitrile azeotrope rather than from the dry acrylonitrile as practiced previously.

In carrying out the invention a cycle of operation is established involving the steps of continuously charging an acidic aqueous solution of a cuprous salt, preferably cuprous chloride, maintained at a temperature not greater than 100° C. and preferably at 80° C. to 90° C., with acetylene and hydrocyanic acid, continuously removing the vapors of acrylonitrile, water, hydrochloric acid, by-product gases, unreacted acetylene and a small amount of unreacted hydrocyanic acid, condensing the bulk of the water vapor at a suitable temperature along with most of the hydrochloric acid and returning this condensate to the catalyst chamber, absorbing the acrylonitrile, the unreacted hydrocyanic acid, some unreacted acetylene, and some organic by-products in water, stripping this aqueous solution with a gas to remove cyanobutadiene, and returning the unreacted acetylene to the catalyst chamber after scrubbing it with a solvent to remove by-product impurities, in particular vinyl acetylene. Fresh acetylene is added to the system as needed and also may serve to strip the absorbed aqueous solution of cyanobutadiene. Hydrocyanic acid also is added to the system as required. The recycle gas stream is vented as required to maintain the desired acetylene concentration in gas cycled back to the reactor. The acrylonitrile is recovered and purified in an improved manner as described below.

It is one of the main objects of the present invention to improve the process of producing acrylonitrile by the liquid phase reaction of hydrocyanic acid and acetylene, as described, by a method involving the reduction of formation of undesirable by-products. Another object is to provide a process where the life of the catalyst for the production of acrylonitrile is extended. Another object is to supply a process where the loss of acrylonitrile due to polymerization is minimized. Still another object is to supply a cyclic process for the production of acrylonitrile where vinyl acetylene is removed from the cyclic process in an improved and simple manner. Another object is to supply a process for the production of acrylonitrile where the reduction of the water and acidity content of the catalyst solution is minimized. Still another object is to supply a process for the production of acrylonitrile of sufficient purity for polymerization purposes.

The invention will be more readily understood by reference to the accompanying drawings, in which:

Fig. 1 is a flow sheet showing the novel process, the legend AN referring to acrylonitrile;

Fig. 2 is a diagrammatic showing of apparatus for carrying out the process of Fig. 1; and Fig. 3 is a graph showing the properties of various solvents for vinyl acetylene. In this graph one axis represents the volume of solvent required to dissolve one volume of gas, the volumes being calculated under S. T. P. conditions. The other axis represents temperature in degrees centigrade.

Referring now to Figs. 1 and 2, the process and apparatus for carrying it out may be readily understood by considering these two figures together, apparatus being shown in Fig. 2 and also referred to, in part, in Fig. 1.

Hydrocyanic acid is introduced into feed line 1, is mixed with acetylene-containing gas at junction 2, and the mixture is passed by line 3 into chamber 4 where it is intimately mixed with catalyst solution. The catalyst chamber is heated to the desired temperature by a suitable heating device not shown, and may include an external leg (not shown) which gives an "air lift" effect, causing circulation as a result of the difference in the density of the gas-catalyst mixture in the reactor and the catalyst in the leg. The acrylonitrile, unreacted acetylene, unreacted hydrocyanic acid, water vapor, hydrochloric acid, and by-product organic materials pass as vapors from the reactor through pipe 5 and are cooled in cooler 6 to a suitable temperature, generally in the range of 20° C. to 30° C., where the water separates out of the gas mixture as a liquid along with most of the hydrochloric acid and minor amounts of other constituents.

The gas stream and condensate then pass through pipe 7, into separator 8, where the liquid condensate is removed through pipe 9 and is passed back to the catalyst solution in chamber 4. The gas stream passes from the separator 8 through line 11 into absorber 12 where it is absorbed in part in water or other suitable solvent. Water is the preferred solvent. Essentially all of the acrylonitrile and hydrocyanic acid are absorbed in water. The water passes into the absorber through line 13 and the aqueous solution is discharged from absorber 12 through line 14.

The unabsorbed gases pass out of absorber 12 into line 15 and then into scrubber 16 where they are washed with a suitable solvent for removal of gaseous impurities from the acetylene. The particular impurity we have found desirable to remove at this point is vinyl acetylene. The solvents used for scrubbing will be described hereinafter. The scrubbing solvent enters scrubber 16 by means of pipe 17, and the solvent leaves by line 20. The solvent then passes through cooler 18, pipe 17 and back into the scrubber. Suitable means for removing the absorbed impurities from a part or all of solvent after it leaves line 20 and before it re-enters the scrubber 16 are not shown. These may include evaporation and distillation.

The scrubbed gases containing mainly acetylene and inert materials pass out of scrubber 16 through line 22 into scrubber 23, where vaporized or entrained solvent from scrubber 16 is removed from the gas stream by means of water or other suitable solvent which is introduced into scrubber 23 by means of pipe 26, is withdrawn from scrubber 23 by means of pipe 24 and again re-enters the scrubber by means of pump 25 and pipe 26. The absorbed materials are removed from the solvent of scrubber 23 by means not shown, such as continuous or intermittent evaporation or distillation. Where water is used as the scrubbing solvent, fresh water may be employed in scrubber 23, if desired, instead of recirculated water, or a portion of the recirculated water may be continuously or periodically withdrawn and replaced by fresh water. The amount of solvent carried along with the gas stream from scrubber 16 depends mainly on the vapor pressure of the solvent employed in scrubber 16. In some cases the amount may be negligible, in which instance scrubber 23 may be dispensed with. The washed gas stream leaving scrubber 23 contains mainly acetylene and inert materials. It passes through line 27 to junction 29 where acetylene make-up feed is added, and the gas stream then passes through pump 31 to junction 2 where hydrocyanic acid is added. A portion of recycle stream may be vented at 28. The cycle as described is repeated.

The aqueous solution of acrylonitrile from absorber 12 passes into line 14 and then into stripper 32. Here, the fresh acetylene feed entering stripper 32 from pipe 33, washes cyanobutadiene out of the aqueous acrylonitrile solution. This substance is a particularly undesirable impurity in acrylonitrile since it tends to promote polymerization of the acrylonitrile in subsequent recovery procedure. The acetylene, after passing through stripper 32, enters line 34, line 30 and finally feeds into the recycle gas stream at junction 29 to be introduced to the catalyst chamber as already described. The stripped aqueous solution enters crude still 38 by means of line 37 through heater 68. The acrylonitrile-water azeotrope is distilled over and passes into line 40. The still bottoms consist of water free from acrylonitrile. This passes out of still 38 by means of line 41 and then is cooled by cooler 42 and is reused as absorber solvent after passing through line 13. A portion of this recirculated water may be removed continuously or intermittently and replaced by fresh water as needed to prevent build-up of impurities such as hydrochloric acid. The azeotrope of water and acrylonitrile passing through line 40 is cooled by means of cooler 43. Depending upon the conditions employed, cooler 43 may be eliminated from the apparatus. The azeotropic mixture then enters stripping still 45 by means of line 44.

The volatile impurities such as acetylene, acetaldehyde, and hydrocyanic acid are stripped from the aqueous solution in still 45 and are discharged through line 46, cooled by means of cooler 47, and then passed into absorber 49 by line 48. The hydrocyanic acid, acetaldehyde, and lactonitrile which may be formed are absorbed in absorber 49 by water entering at line 50 and leaving by line 51. The gases remaining consist mainly of acetylene. These leave absorber 49 by means of line 36 and are mixed with the recycle acetylene at junction 37, then are passed into scrubber 16. Depending upon the concentration of impurities, this acetylene stream may be introduced directly into the fresh acetylene stream in line 30 at point 35.

The water and acrylonitrile, leaving the stripping still 45 by means of line 52, are cooled by cooler 53 and passed through line 54 to decanter 55. Here two layers separate out. The lower layer or water layer is returned to the crude still by line 56, entering line 37 at junciton 39. The upper layer, or acrylonitrile layer, is drawn off by line 57 and is passed into the purification still 58 where it is separated from higher boiling materials such as lactonitrile by fractional distillation. The distillate consists of purified acrylonitrile and some water which may be on the order of three per cent by weight of the distillate. The distillate which passes through line 59 through cooler 60, and through line 61 is drawn off. As such the material is suitable for polymerization to polyacrylonitrile such as by emulsion, bead, or solution polymerization where the water content exerts no undesirable influence. For other uses the purified acrylonitrile may be dried by a suitable means not shown, such as by distillation, or the like.

The bottoms from the purification still are drained by means of line 62, cooled by cooler 67 and enter bottoms still 63. The acrylonitrile present is distilled over in still 63 to line 64 through cooler 65 and out line 66. The higher boiling impurities which constitute the still residues, are mostly lactonitrile. Generally this still is operated under reduced pressure to prevent decomposition of lactonitrile to acetaldehyde and hydrocyanic acid. The acrylonitrile collected at line 66 is not pure and is generally returned to the crude still for redistillation.

It is to be understood that the apparatus described may contain various auxiliary devices not listed such as meters, valves, temperature recorders, surge tanks, booster pumps and so forth. The stills shown are generally of the packed column variety suitable for fractional distillation, although other types of fractional distillation columns of the proper designs may be used. Although only the bottoms still is described as operating at other than atmospheric pressure, it is evident that the other stills may be operated under vacuum or pressure if desired. For example, the azeotrope crude still may be operated under vacuum and the stripping still may be operated in part as a flash evaporator under vacuum and so on. In addition, scrubbers or absorbers may be operated at pressures other than atmospheric if desired.

Even though cooler 6 and separator 8 function to separate the bulk of the water and hydrochloric acid carried over from reactor 4 through pipe 5, there is some small loss of water and hydrochloric acid from the reactor. Part of the loss of hydrochloric acid, for example, may be accounted for as chlorinated by-products and part of the loss of water may be accounted for in the formation of by-products such as acetaldehyde and lactonitrile. Make up water and hydrochloric acid must be added to the catalyst solution from time to time or in a continuous fashion, to maintain the acid and water content of the catalyst solution at the optimum operating level. In the apparatus arrangement described these materials may be added by means of line 10, and enter the catalyst chamber along with the acid condensate by line 9. The drain line for withdrawing catalyst solution from the chamber 4 is not shown.

To stabilize the acrylonitrile during heating operations such as during distillation we find it highly desirable to add, continuously or periodically, methylene blue to the acrylonitrile. Means for addition of methylene blue or other stabilizers to distillation column 38 are shown at 38a in Figure 1, it being understood that similar means are used with the other columns. Generally, the stabilizer is dripped in as a solution at the top of the columns. We are aware that stabilizers, such as spent catalyst solution, have been proposed to be used to prevent acrylonitrile polymerization during distillation, but we find stabilizers such as methylene blue function best in our improved process. In the operation of the usual type of liquid phase process by others for producing acrylonitrile from hydrocyanic acid employing a Nieuwland catalyst, methylene blue has been found not to function as a stabilizer in recovery procedures (see BIOS Miscellaneous Report No. 90, pp. 32 to 39, in particular page 34, line 10).

The following novel features apparently bring about the improved results we obtain by our process.

(a) The removal of cyanobutadiene from the aqueous solution by means of gas stripper 32. This greatly facilitates the further handling and purification of the acrylonitrile. We have found that cyanobutadiene promotes polymerization of acrylonitrile, and we have discovered that stripping of the aqueous acrylonitrile solution by means of a gas, particularly acetylene, removes the cyanobutadiene from the aqueous solution. Whatever the explanation, we find that far less acrylonitrile is polymerized, such as in our stills for example, during recovery and purification when we strip the cyanobutadiene from the aqueous acrylonitrile solution with a gas.

(b) The removal of vinyl acetylene from the recycle gas stream at 16 by means of preferred solvents. We have found that the presence of vinyl acetylene in the catalyst chamber promotes the formation of divinyl acetylene, higher acetylene polymers, and cyanobutadiene.

The removal of vinyl acetylene from the recycle gas stream is thought to suppress the formation of divinyl acetylene, ethynyl butadiene, cyanobutadiene, and chloroprene. These compounds are formed presumably as follows:

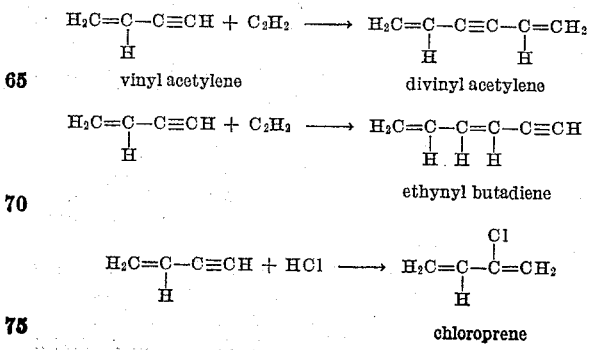

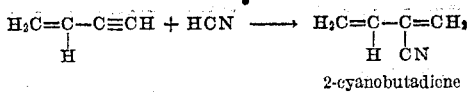

2-cyanobutadiene

In the reaction of acetylene with vinyl acetylene, the divinyl acetylene appears to be formed to a greater extent than ethynyl butadiene. It is thought that cyanobutadiene acts as a polymerization catalyst. The exact mechanism for this action is not known. We have found that removal of vinyl acetylene from the locus of the reaction of hydrocyanic acid and acetylene by solvent absorption is also desirable in that the life of the catalyst solution is extended. Certain solvents can be used to very good advantage in the removal of vinyl acetylene from a gas containing acetylene due to the much greater solubility of vinyl acetylene in these solvents as compared with acetylene.

(c) The separation of water and hydrochloric acid from the product gases by means of cooler 6 and separator 8. We have found that the removal of water and hydrochloric acid by condensation from the product gases and the return of the condensate to the catalyst solution is very desirable in maintaining the catalyst solution in an active state. Without this arrangement, we find increased operating difficulty due to the requirement of much closer controls in the operation necessitated by the large loss of these materials. With this arrangement much less make up water and hydrochloric acid need be added and many less determinations of water content and acidity of the solution need be made.

(d) The return of the unreacted acetylene absorbed with the product materials to the catalyst chamber. The acetylene which is unreacted is returned for the most part by means of line 27 to the reactor 4. A portion of it, however, is absorbed by the water, or other solvent in absorber 12 and a further amount may be absorbed in stripper 32. The acetylene present in this aqueous solution of acrylonitrile is removed at the gas stripping still 45. We have discovered that this acetylene need not be discarded or burned as has been proposed in the past, but it can be recovered as follows. The bulk of the gaseous impurities are absorbed from the acetylene stream by means of water in absorber 49. These include acetaldehyde, hydrocyanic acid, and lactonitrile. The acetylene is returned to the system via lines 36 and 15, or via lines 36 and 30.

(e) The reuse of absorber water. Heretofore, water used for absorbing acrylonitrile has been described as not reusable for absorption after removal of the acrylonitrile due to foaming and the like. (See FIAT Final Report No. 1025, pg. 4, paragraph 1, lines 2 to 4.)

The reutilization of water for absorption in our improved process is advantageous because acrylonitrile is not lost to the drain if incorrect operation of the crude still 38 should occur. As already mentioned, provision for prevention of slow accumulation of hydrochloric acid or other impurities in the water should be made such as by means of ion exchange removal or by means of withdrawing a portion of the water intermittently or continuously and the introduction of make up water as required. In any case some make up water has to be continuously added to replace that lost in subsequent treatment of the crude still distillate. We are not certain why foaming of the crude still bottoms (water) does not occur, but we believe it is due to the combination of improvements already described under (a), (b), and (c).

(f) In addition to these major improvements present in our process, we find that the gaseous impurities may be advantageously removed from the water-acrylonitrile azeotrope instead of from the dry acrylonitrile as has been proposed by others.

We find that we need carry out no special operation for drying the acrylonitrile to obtain a pure product satisfactory for polymerization as by emulsion, bead, or solution polymerization, or the like, where the water present is not disadvantageous. This makes for economy in operation due to the fact that we need employ no special drying columns to remove water, nor any special extraction techniques (as in U. S. 2,404,163) to obtain a refined product suitable for polymerization. These arrangements are often expensive and often present operational difficulties. If a dry product is desired we prefer to dry our final pure product by any suitable method as by distillation. By acrylonitrile suitable for polymerization we mean a product which can be polymerized to give a polyacrylonitrile which is soluble by the usual methods in appropriate solvents such as dimethyl formamide.

It has been disclosed by others that the removal of impurities from the recycling acetylene in a cyclic process is desirable. One method suggested for removing impurities such as vinyl acetylene is by condensation from the acetylene stream at very low temperatures of from −50° C. to −70° C. This method is not only expensive due to refrigeration cost, but also quite hazardous. (See FIAT Final Report 1125, p. 4, paragraphs 4 to 6.) It has also been proposed to use chemically activated charcoal to remove vinyl acetylene from the gas stream (ibid., p. 10, paragraph 1). In addition, bauxite, charcoal, and other adsorbents have been proposed (see U. S. 2,385,469 and U. S. 2,385,470) for removing by-products from recycle acetylene (presumably vinyl acetylene is one of the by-products although it is not mentioned). We have found that these adsorbing methods are not economical due to the difficulty of desorbing the vinyl acetylene and other products. In other words the carbon adsorbents which we have employed functioned to remove vinyl acetylene, but could not be reactivated to their original activity by steaming, or the like after being used. We believe this was due to formation of non-volatile polymers of some sort on the surface of the adsorbent. It is perfectly possible that chemically activated charcoal or some other adsorbent may function economically but the exact nature or the preparation of a suitable adsorbent has not been disclosed in these proposals.

It has been suggested by others to remove gaseous impurities from acetylene by means of higher alcohols, as glycerin or ethylene glycol, by means of mineral oils or by means of high boiling esters such as dibutyl phthalate. (See Salley U. S. 2,385,469 or Salley et al. U. S. 2,385,470.) Although these solvents may function to remove certain by-product impurities from the recycle gas stream in the particular cyclic systems for which they have been suggested, we have found that we can employ other solvents to better advantage in our process. We have determined that vinyl acetylene is the major impurity that we should remove by solvent absorption to extend the life of the catalyst and prevent formation of divinyl acetylene. Accordingly, we have found that a solvent exhibiting preferential solubility for vinyl acetylene as compared with acetylene is required. In the carrying out of the absorption process, the impurities are absorbed into the solvent which is of such a nature that the volatile impurities absorbed can be readily removed by a simple means such as vacuum stripping, flash evaporation, heat stripping or the like. We have found that even though these gaseous impurities are removed, and the solvent is reused for absorption, high boiling products accumulate in the absorption solvent such as higher acetylene polymers and the like. A part of these are formed, we believe, during the solvent absorption operation. In any case, we have discovered that we are required to repurify the solvent by distillation or the like from time to time, or continuously withdraw and repurify a portion of it. In this regard we have found ethylene glycol, glycerol, dibutyl phthalate and mineral oils to be unsatisfactory due to their high boiling points and distilling characteristics. Of a large number of solvents examined we have found three to have the solvent, vapor pressure and distilling characteristics desired. These are methanol, acetone, and ethyl benzene. With these solvents we find that we can preferentially absorb vinyl acetylene as well as other impurities from the recycle gas without the loss of large amounts of acetylene.

Figure 3 shows the solvent properties of these solvents as compared with ethylene glycol. Along one axis of the graph is plotted the volume of solvent required to dissolve one volume of gas. The volumes are calculated as under S. T. P. conditions. Along the other axis is plotted the temperature in degrees centigrade. It is evident from an examination of Figure 3 that the preferred solvents exhibit greater solubility for vinyl acetylene and more preferential solubility of vinyl acetylene as compared with acetylene than does ethylene glycol. For example, at 0° C. one volume of vinyl acetylene will be absorbed by about $1.2 \times 10^{-3}$ volumes of methanol, $3.3 \times 10^{-4}$ volumes of acetone, $7.4 \times 10^{-4}$ volumes of ethyl benzene, or $2.1 \times 10^{-2}$ volumes of ethylene glycol. In other words 20 to 60 times as much ethylene glycol must be employed for absorption at 0° C. as one of our preferred solvents for removal of a given amount of vinyl acetylene. The amount of acetylene soluble in a volume of these solvents at 0° C. which will absorb one volume of vinyl acetylene is as follows: .021 volume in methanol, .014 volume in acetone, .0062 in ethyl benzene, and 0.15 volume in ethylene glycol. This means that 7 to 24 times as much acetylene would be expected to be lost using ethylene glycol instead of one of our preferred solvents at 0° C. for absorbing vinyl acetylene. At lower temperatures the difference is even more pronounced. At −15° C. the solvent requirement for absorbing one volume of vinyl acetylene is $4.2 \times 10^{-4}$ volumes of methanol, $8 \times 10^{-5}$ volumes of acetone, $2 \times 10^{-4}$ volumes of ethyl benzene, and $1 \times 10^{-2}$ volumes of ethylene glycol. The acetylene soluble at this temperature is .011 volume in methanol, 0.0057 volume in acetone, .0028 volume in ethyl benzene, and 0.10 volume in ethylene glycol.

In general, the usual temperature of operation of scrubber 16 is less than 15° C. and may be as low as −30° C. The operation at low temperatures is desirable because less solvent is carried along with the scrubbed gas leaving scrubber 16 and as a result less solvent needs to be removed from this gas stream in the secondary scrubber 23. In fact, when operating scrubber 16 at −10° C. or less using ethyl benzene as a solvent, we find we can dispense with the secondary scrubber 23 entirely, without adversely affecting the reaction of hydrocyanic acid and acetylene due to contamination of the recycle gas stream. When operating scrubber 16 with acetone or methanol we find it desirable to operate scrubber 23 using water as the solvent. Of course scrubber 23 can be replaced by any other suitable means for removing the methanol, acetone, or ethyl benzene from the scrubbed gases leaving scrubber 16, such as selective adsorption by means of carbon or the like. Other advantages to operating scrubber 16 at low temperatures are the reduction of amount of acetylene removed during scrubbing and the use of less solvent to remove a given amount of vinyl acetylene. For most economical operation the advantages listed must be balanced against refrigeration costs for producing the low temperature.

It has been disclosed in Patent 2,526,676 (Lovett) that 2-chlorobutadiene, monovinyl acetylene and divinyl acetylene can be stripped from an aqueous acrylonitrile solution by stripping with acetylene or other gas, but there is apparently a basic difference between Lovett's process and ours, since cyanobutadiene is the only constituent substantially completely removed by our stripping operation. The return of this by-product to the reaction is important, as is explained herein. Substantially all of the monovinyl acetylene is insoluble in water under the conditions of operation outlined in Example 1 to follow, and need never be stripped by acetylene or other gas. It is also important to note that no chlorobutadiene nor divinyl acetylene is found in our process unless improper operation is occurring, as shown in Example 2(b) below.

Lovett's process also has the basic defect that his stripping acetylene cannot be used as a reactant directly without further treatment. The use of inert gas would require scrubbing or other treatment for removal of stripped impurities prior to reuse of the inert gas for further stripping. It is obvious that a scrubbing treatment such as Lovett finds necessary brings about loss of acrylonitrile entrained in the gas stream, lowering the efficiency of the system.

EXAMPLES OF OPERATION

The following examples illustrate the improved results obtained using our process of operation. Comparisons will be made between operation of a process employing our novel improvements and a process of the usual type proposed by others.

Example 1

A catalyst solution of the initial composition, 40 per cent cuprous chloride, 19 per cent potassium chloride, 7 per cent sodium chloride, 1 per cent hydrochloric acid, and 33 per cent water was introduced to catalyst chamber 4, which was a jacketed glass-lined vessel. The total volume of catalyst solution was about 8.3 cubic feet at 25° C. with a specific gravity of 1.7. The catalyst solution was kept at 85° C. during operation. Acetylene and hydrocyanic acid were introduced at line 3 to the catalyst chamber and the process was carried out in a manner already described. When a steady state of operations was reached using pure hydrocyanic acid and pure acetylene diluted with nitrogen, the acid concentration of the catalyst solution reached a value of about 0.25 per cent, and about 2 per cent ammonium chloride was present in the active catalyst solution. The conditions of operation were as follows after a steady state was reached. The feed stock to the reactor in pounds of reactants per hour was on the average 29 of acetylene, 4.21 of hydrocyanic acid, 0.26 of acrylonitrile, .01 of cyanobutadiene, 0.70 of water, and 7.17 of nitrogen. The gaseous products leaving the catalyst chamber were cooled by cooler 6 to about 25° and the condensed products consisting mostly of water were returned to catalyst chamber 4 by means of line 9. The gas stream, leaving separator 8 by means of line 11, was of the following composition in pounds per hour: 25.1 acetylene, 0.51 hydrocyanic acid, .12 cyanobutadiene, 0.91 water, 7.17 nitrogen, 6.49 acrylonitrile, 1.27 lactonitrile and 0.114 monovinyl acetylene. Any acetaldehyde present is calculated here as reacting with hydrocyanic acid to form lactonitrile.

The gas stream was absorbed by water at the rate of approximately 400 pounds of water per hour at 20° C. The unabsorbed gases from absorber 12 entering line 15 had the following average composition in pounds per hour: 24.8 of acetylene, .11 of cyanobutadiene, 0.114 of monovinyl acetylene, .01 of hydrocyanic acid, and 7.17 of nitrogen. These gases entered scrubber 16 operated at −15° C. with a recirculated methanol stream of about 400 pounds per hour and a fresh methanol make-up of about 10.9 pounds per hour. The gas stream scrubbed free from monovinyl acetylene was washed with water in scrubber 23 at about 20° C. Approximately 400 pounds per hour of water was recirculated through this scrubber with a fresh feed of about 10 pounds per hour. The acetylene absorbed in the scrubber amounted to 0.1 to 0.2 of a pound per hour. The methanol discharged from scrubber 16 was recovered by diluting the methanol with water, separating the organic layer, and distilling the aqueous methanol layer. The acetylene and nitrogen in the gas stream leaving scrubber 23 by means of line 27 were saturated with water to the extent of about 0.6 pound per hour. In steady operation this recirculated gas was kept at the following flow rates: 24 to 25.5 pounds per hour of acetylene and 6.5 to 7.5 pounds per hour of inert gases, mostly nitrogen. Although the fresh acetylene was essentially pure, minor amounts of other gases built up in concentration in the recycle gas stream.

The concentration of inerts was maintained within the desired limits by means of purging through vent 28. Of course more nitrogen could be introduced to the system as desired. The average flow of acetylene in this example in line 27 was 24.7 pounds per hour with 7.17 pounds per hour of nitrogen. The stream was reintroduced to the reactor by means of line 29, pump 31 and line 3.

The aqueous solution leaving absorber 12 by line 14 had the following average composition in pounds per hour: 0.29 acetylene, 0.50 hydrocyanic acid, 0.01 cyanobutadiene, 401 water, 6.49 arylonitrile, 1.27 lactonitrile, and no detectable monovinyl or divinyl acetylene. The solution entered stripper 32 and was freed of the cyanobutadiene by means of fresh acetylene stream entering stripper 32 by line 33 at the rate of about 3.94 pounds per hour saturated with water to the extent of about .093 pound per hour.

The aqueous solution leaving the cyanobutadiene stripper by line 37 entered the crude still with the following average composition in pounds per hour: 0.29 acetylene, 0.50 hydrocyanic acid, 402 water, 6.31 acrylonitrile, and 1.26 lactonitrile. The slightly larger amounts of acrylonitrile and water are due to the decanter aqueous solution from line 56 which amounted to 0.081 pounds per hour of acrylonitrile and 1.1 pounds per hour of water. A small amount of acrylonitrile (about 0.25 pound per hour) was also carried along with the acetylene stream. The crude still was operated at an overhead temperature of 75° C., a base temperature of 105° C. and the feed stock was preheated to 90° C. by means of heater 68.

Water was withdrawn from the base of the crude still 38 by means of line 41 at the rate of 400 pounds per hour. This was cooled by means of cooler 42 and returned to the absorber 12. The distillate from crude still 38 was passed without cooling into stripping still 45 by means of lines 40 and 44. The volatile components were stripped off at 35° C. and were passed through lines 46 and 48 into the absorber 49 at the rate of 0.29 pound per hour of acetylene, 0.858 pound per hour of lactonitrile and 0.51 pound per hour of hydrocyanic acid. The lactonitrile and hydrocyanic acid were scrubbed out by means of water and discharged through line 51. The acetylene was passed through line 36 at the rate of about 0.29 pound per hour and was added to the fresh acetylene feed at junction 35. Gas scrubber 49 was operated with water recirculating at the rate of about 8 gallons per hour, with a fresh feed make-up of 3.5 pounds per hour of water.

The aqueous solution was withdrawn from the bottom of the gas stripping still 45 by means of line 52 at the rate of 1.26 pounds per hour of water, 6.31 pounds per hour of acrylonitrile, and .40 pound per hour of lactonitrile. This was cooled to 15° C. by means of cooler 53 and passed into decanter 55 by means of line 54. The aqueous layer was withdrawn from the decanter by line 56 at the rate of 1.1 pounds per hour of water and 0.081 pound per hour of acrylonitrile. This solution was returned as crude still feed, being admitted to the scrubbed absorber solution at junction 39 as already described. The acrylonitrile layer was passed directly from the decanter 55 by means of line 57 into the purification still 58 at the rate of 6.23 pounds per hour of acrylonitrile, 0.40 pound per hour of lactonitrile and 0.18 pound per hour of water. This still was operated at atmospheric pressure at an overhead temperature of 77° C. and a base temperature of 85° C. The distillate amounted to 5.8 pounds per hour of pure acrylonitrile and 0.183 pound per hour of water. This was withdrawn through line 59, cooler 60, and line 61. The still bottoms were withdrawn through line 62 at the rate of 0.43 pound per hour of acrylonitrile and 0.40 pound per hour of lactonitrile. The acrylonitrile present in the bottoms was recovered by vacuum distillation by means of a still 63, operated at 150 mm. pressure. The impure acrylonitrile withdrawn at 66 could be reintroduced to the feed of crude still 38.

In every still methylene blue solution was added at the still head at a rate of up to 1 cc. per minute of a saturated solution in water, depending upon the amount of acrylonitrile being distilled over.

Acetaldehyde and hydrocyanic acid appeared to be in equilibrium with lactonitrile. In this example, acetaldehyde was calculated and listed as lactonitrile. The still bottoms from the bottoms still 63 contained minor amounts of impurities other than lactonitrile. These high boiling impurities were not identified.

The acidity of the catalyst solution was maintained by additions of small amounts of hydrochloric acid. Under these conditions of operation this amounted to only nine pounds of hydrochloric acid for every thousand pounds of hydrocyanic acid passed into the catalyst solution. To maintain the water concentration only 0.2 to 0.3 pound per hour of make up water were added to the catalyst solution. The activity of the catalyst solution at the outset of the operation was 1.1 pounds of acrylonitrile per cubic foot of catalyst solution per hour. This activity slowly decreased with time. We have found the average optimum rate to be about 0.75 pound of acrylonitrile per cubic foot of catalyst solution per hour. This required a complete replacement of the catalyst solution on the average of once every thirty days to maintain the catalyst activity.

The acrylonitrile obtained from the final purification still did not test for divinyl acetylene and was suitable for polymerization without further treatment.

With the arrangements as described, no appreciable polymer formation was observed in the system, over a period of continuous operation of over 3 months. That is, after this time, the equipment was dismantled and the stills, preheaters, and so forth were examined. No polymer deposition was found. Although some polyacrylonitrile might have been present in minor proportions in the final still residue, there was no formation of polymeric material in the system to present any operational difficulties. It appeared that the improved process could have been operated for almost any extended period of time in a continuous fashion without serious difficulties of polymer formation. In addition, chloroprene could not be identified among the by-products formed.

*Example 2*

The apparatus described was operated in a manner similar to Example 1 at approximately the same catalyst activity.

Elimination of the water and hydrochloric acid separator 8 from the system, increased the amount of hydrochloric acid required to maintain the acidity of the acid solution by from 2 to 3 times as much as the amount necessary in Example 1.

In order to test their effect, the cyanobutadiene scrubber 32 and the vinyl acetylene scrubber 16 were removed from the system with the following results.

(*a*) The water from crude still 38 bottoms could not be recirculated and reused in absorber 12, because of excessive foaming.

(*b*) Divinyl acetylene, cyanobutadiene, and chloroprene were found in the gases entering the crude still 38.

(*c*) Heater 68 had to be removed because of polymer formation on the walls with subsequent loss in heat transfer. At the end of 5 or 6 days, the tubes of this heater became entirely plugged with polymer.

(*d*) Crude still 38 had to be dismantled and cleaned free of polymer at the end of three weeks' operation. Noticeable loss in heat transfer efficiency of this still was observed at the end of one week of operation. The stills 45, 58, and 63 also exhibited some polymer formation on the interior walls and heating surfaces.

(*e*) The final acrylonitrile obtained as distillate from purification still 58, contained up to 0.5 per cent divinyl acetylene. The quality of the material as judged by its polymerization characteristics was erratic. For example, sometimes polyacrylonitrile produced from it was insoluble in dimethyl formamide and other solvents. At other times the polyacrylonitrile would be partially soluble, but form gel lumps in solution.

(f) The original catalyst activity of a freshly made catalyst solution was 0.87 pound of acrylonitrile per cubic foot of catalyst solution per hour. In order to maintain the average activity of 0.75 pound of acrylonitrile per cubic foot of catalyst solution per hour, the catalyst solution had to be replaced on the average of every 16 days.

(g) Excessive acetylene had to be removed from the system by purging to maintain the vinyl acetylene in the recycle gas less than 6 per cent of the total volume of gases. This was thought to be necessary to prevent excessive formation of divinyl acetylene with subsequent serious contamination of the final product.

*Example 3*

Results equal to those obtained in Example 1 were obtained by employing ethyl benzene as a scrubbing solvent in scrubber 16. This was recirculated at the rate of 200 pounds per hour with a fresh feed make-up of 6 pounds per hour. Acetone was also employed in scrubber 16 at a recirculation rate of about 85 pounds per hour and a feed make-up of about 3 pounds per hour with similarly good results.

*Example 4*

Instead of scrubbing the absorber solution with fresh acetylene feed as in Example 1 in scrubber 32, the cyanobutadiene was removed as well by scrubbing the absorber solution with 0.8 cubic feet per minute of nitrogen. The fresh acetylene feed was passed directly into line 30. The nitrogen from the scrubber contained some acetylene and a small amount of acrylonitrile which might have had to be separated and recovered for successful commercial operation.

The following observations will be useful to one practicing our invention:

(a) The temperature ranges for operating the acrylonitrile reaction from hydrocyanic acid and acetylene using an aqueous solution containing a Nieuwland type catalyst is generally less than 110° C. but above 50° C. with preferred temperatures of 75° C. to 90° C.

(b) The molar ratio of fresh acetylene to fresh hydrocyanic acid fed into the reactor is usually between 1.2 and 0.83.

(c) The temperature of operation of the separation of aqueous condensate from the hot gaseous products issuing from the catalyst chamber is not critical, but is preferably 20° C. to 30° C.

(d) The temperature of operation of the water absorber 12 is preferably 10° C. to 25° C., although higher temperatures can be used with subsequent decrease in the rate of absorption of acrylonitrile, or temperatures as low as 0° C. can be employed. The water solution produced generally contains 1 to 2 per cent acrylonitrile.

(e) The temperature of operation of the vinyl acetylene scrubber employing acetone, methanol, or ethyl benzene as a solvent is preferably −20° C. to 0° C. although temperature ranges of from −30° C., or lower, to 15° C. can be employed as already explained.

(f) The temperature of operation of the cyanobutadiene stripper 32 is generally kept at 20° C. to 30° C.

(g) The temperature of operation of the absorber 49 is generally kept at 20° C. to 30° C. and this does not appear to be critical.

(h) The temperature of the still 63 is critical in that too high a temperature of operation will produce appreciable breakdown of lactonitrile to hydrocyanic acid and acetaldehyde. This still is generally operated at a total pressure of 130 to 150 millimeters of mercury with a base temperature of not greater than 85° C. and a head temperature of about 25°–30° C.

USES AND ADVANTAGES

The improved features described herein appear to be useful in other processes for manufacture of acrylonitrile where cyanobutadiene or vinyl acetylene are by-products. The particular advantage of this process over all other processes involving this type of liquid phase reaction is the production of a product free from impurities which adversely affect the polymerization of acrylonitrile (divinyl acetylene), and elimination of polymer formation during processing, presumably due to the removal of cyanobutadiene from the product prior to treatment by distillation. Other advantages have been discussed previously herein.

We claim:
1. The process for production of acrylonitrile which comprises continuously reacting acetylene and hydrocyanic acid in the presence of an acrylonitrile-forming aqueous catalyst solution at 75–90° C., cooling the gaseous products obtained to a temperature of 20° to 30° C. and returning the condensate to the catalyst solution; absorbing part of the uncondensed gases and substantially all of the acrylonitrile present into water, recycling at least a portion of the unabsorbed gases to the catalyst solution after treating them at −30° to 15° C. with a solvent for the preferential absorption of vinyl acetylene, said solvent being selected from the group consisting of acetone, methanol and ethyl benzene, stripping the acrylonitrile-containing aqueous solution with acetylene to remove impurities consisting substantially entirely of cyanobutadiene and recycling at least a part of the cyanobutadiene-containing acetylene so produced for use as reactant material; distilling the aqueous acrylonitrile solution, freed from cyanobutadiene, to produce acrylonitrile and water as distillate along with by-product impurities and unreacted feed materials, leaving water free from acrylonitrile as still bottoms, and returning these still bottoms to the process for use in absorbing subsequently produced acrylonitrile; removing by-product impurities and unreacted feed materials from the acrylonitrile-water distillate by distillation, separating the acetylene from impurities by scrubbing with water, and re-utilizing the acetylene so separated as reactant material; cooling the water-acrylonitrile mixture after removal of the volatile impurities and permitting layering of the mixture, separating the two layers thus formed and returning the lower or aqueous layer to the process to be admixed with aqueous acrylonitrile solution subsequently produced, distilling the upper or organic layer to produce pure acrylonitrile distillate containing a small amount of water and a still bottoms containing some acrylonitrile along with non-volatile impurities, recovering the acrylonitrile from the bottoms by distillation, and returning the acrylonitrile so recovered to the process to be admixed with subsequently produced impure acrylonitrile.

2. A process according to claim 1, wherein the unabsorbed gases, after treatment with a solvent for the preferential absorption of vinyl acetylene, are scrubbed with water to remove the solvent from the gases before recycling of the gases to the catalyst solution.

3. The method of separating vinyl acetylene from acetylene in a gas mixture containing acetylene and vinyl acetylene comprising absorbing the vinyl acetylene from the gas mixture by means of a solvent selected from the group consisting of methanol, acetone, and ethyl benzene at a temperature of from about −20° C. to 0° C.

4. In a process for producing acrylonitrile by reacting acetylene and hydrocyanic acid in the presence of an acrylonitrile-forming catalyst solution followed by absorption of acrylonitrile in water to form an aqueous solution, the improvement comprising purifying said acrylonitrile solution by distillation while dropping methylene blue into the distillation apparatus to inhibit polymerization in the apparatus.

References Cited in the file of this patent

UNITED STATES PATENTS

| | | | |
|---|---|---|---|
| 2,217,836 | Dierichs | Oct. 15, | 1940 |
| 2,236,964 | Babcock | Apr. 1, | 1941 |
| 2,236,966 | Balthis et al. | Apr. 1, | 1941 |
| 2,250,925 | Babcock | July 29, | 1941 |
| 2,385,327 | Bradley et al. | Sept. 25, | 1945 |
| 2,409,124 | Heuser | Oct. 8, | 1946 |
| 2,417,068 | Farlow et al. | Mar. 11, | 1947 |
| 2,526,676 | Lovett | Oct. 24, | 1950 |
| 2,579,638 | Zwilling et al. | Dec. 25, | 1951 |
| 2,621,204 | MacLean et al. | Dec. 9, | 1952 |
| 2,649,472 | Lovett | Aug. 18, | 1953 |

OTHER REFERENCES

Nill et al.: Fiat Final Report No. 1125, pgs. 1–11 (1947).